United States Patent [19]

Znidaric

[11] 4,318,657

[45] Mar. 9, 1982

[54] VEHICLE FOR LOADING AND TRANSPORTING HEAVYWEIGHT OBJECTS IN PARTICULAR AUTOMOTIVE VEHICLES

[76] Inventor: Kruno Znidaric, No. 12, Bernsteinweg, 8000 München 45, Fed. Rep. of Germany

[21] Appl. No.: 91,627

[22] Filed: Nov. 5, 1979

[30] Foreign Application Priority Data

Nov. 10, 1978 [DE] Fed. Rep. of Germany ....... 2848904

[51] Int. Cl.³ .............................................. B60P 3/12
[52] U.S. Cl. .................................. 414/478; 414/494; 414/563; 298/14
[58] Field of Search ............................ 414/477–480, 414/494, 563; 298/12, 14

[56] References Cited

U.S. PATENT DOCUMENTS

| | | | |
|---|---|---|---|
| 687,277 | 11/1901 | Somerville | 298/14 |
| 1,264,431 | 4/1918 | Palm | 298/14 |
| 1,693,543 | 11/1928 | Biszantz | 298/14 |
| 3,032,217 | 5/1962 | Musson et al. | 414/477 |
| 3,097,755 | 7/1963 | Fulcher | 414/478 |
| 3,159,294 | 12/1964 | Forsythe | 414/478 |
| 3,450,282 | 6/1969 | Ezolt | 414/477 |
| 3,924,763 | 12/1975 | Pigeon | 414/563 |
| 4,139,236 | 2/1979 | Hill et al. | 414/480 |

Primary Examiner—Joseph E. Valenza
Attorney, Agent, or Firm—John C. Smith, Jr.

[57] ABSTRACT

A vehicle for loading and transporting heavyweight objects, in particular automotive vehicles, comprises an undercarriage, a loading bridge mounted directly on the undercarriage both longitudinally shiftable and tiltable about the rear portion thereof, and at least one power device engaging, preferably in the vicinity of, the front end of the loading bridge and on the other hand, preferably in the vicinity of, the rear portion of the vehicle undercarriage determining the mutual spacing thereof. The power device is alterable in its length. At least one pivot lever is guided at one end with a slide member in a bridge-stationary slide track and is mounted at its other end pivotally in a fulcrum underneath the effective line of the power device, behind the slide member as viewed in relationship to the direction of travel, at the vehicle undercarriage. The slide track at the front has an abutment which by an engagement with the slide member limits the lengthwise extension of the loading bridge.

14 Claims, 4 Drawing Figures

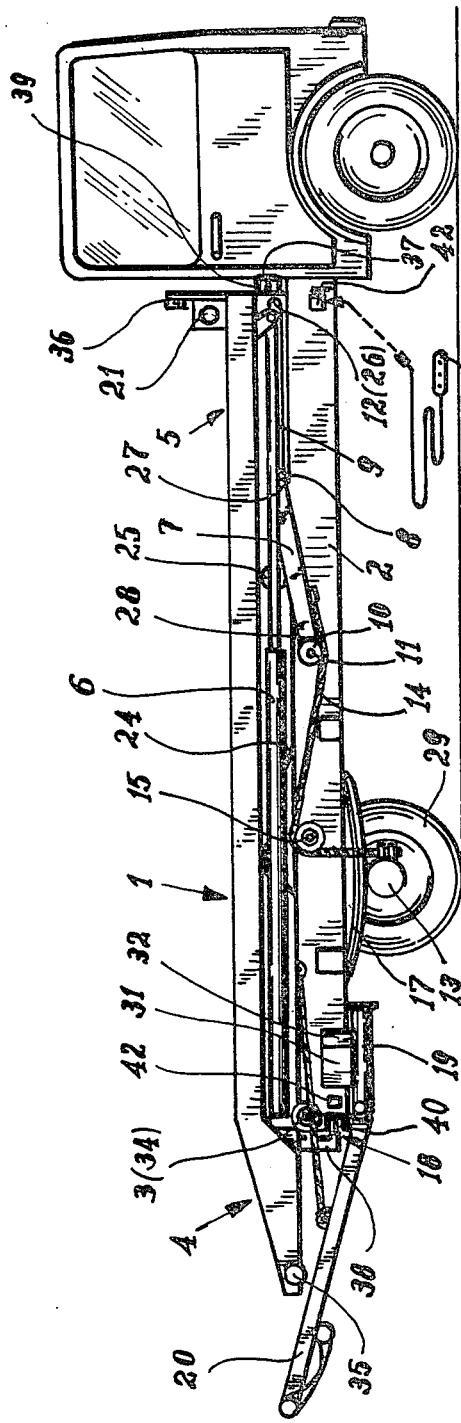
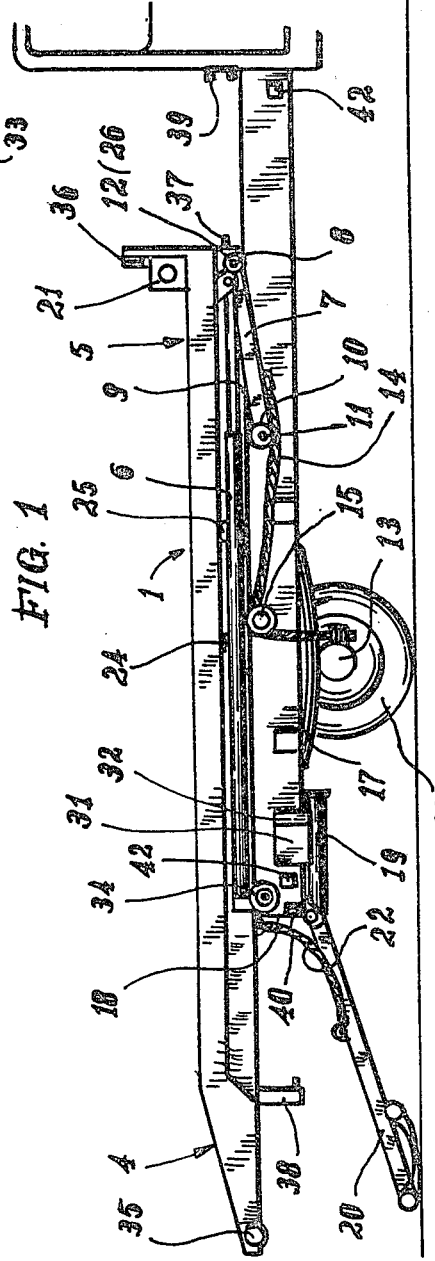
FIG. 1
FIG. 2

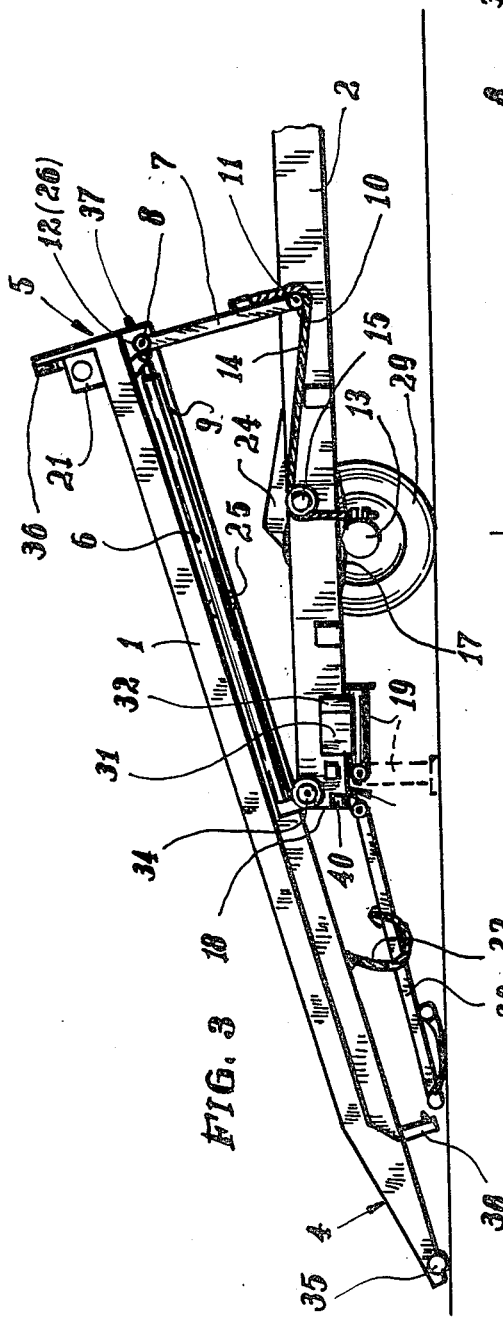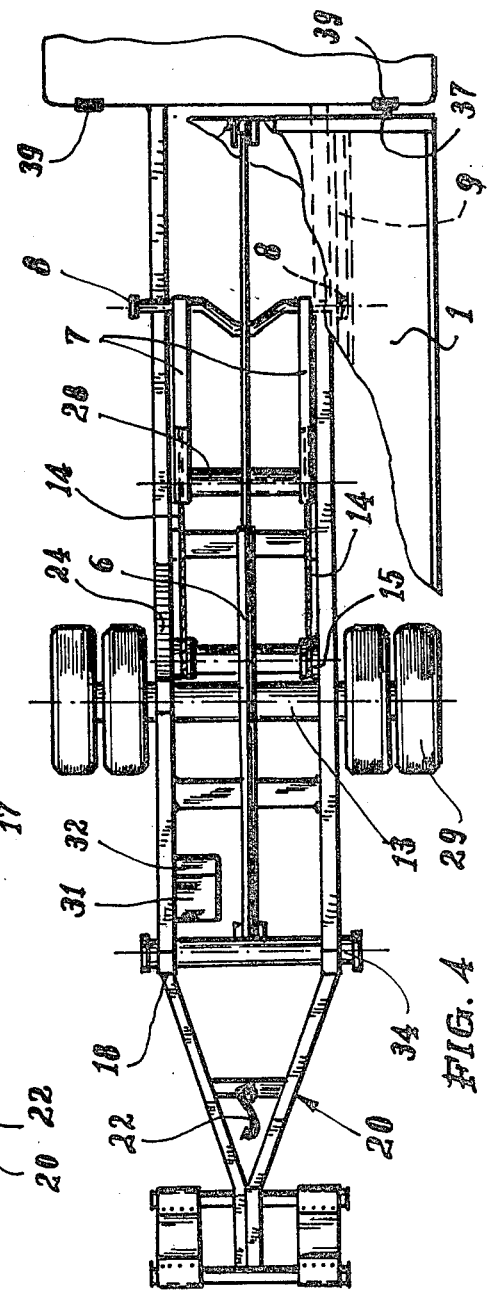

VEHICLE FOR LOADING AND TRANSPORTING HEAVYWEIGHT OBJECTS IN PARTICULAR AUTOMOTIVE VEHICLES

BACKGROUND OF THE INVENTION

This invention relates to a vehicle for loading and transporting heavyweight objects, in particular automotive vehicles.

Such vehicles are provided for the transportation for instance of wreched automotive vehicles or vehicles to be delivered, but also for heavy-duty construction vehicles or construction equipment or safes. Loading may be effected by own power of the automotive vehicle to be transported or by means of a rope winch arranged at the front end of the loading bridge.

With conventional vehicles of these species, there is provided an assistance bridge tiltable by means of two hydraulic units, on which the actual loading bridge is arranged extensible longitudinally by two further hydraulic units. At other vehicles of this type the loading bridge is only tilted, but not extended lengthwise. When manufacturing such vehicles, a large wheel distance must be provided for, since the equipment with a sufficiently long loading bridge requires such because of the strict loading regulations. Series-type undercarriages thus cannot be used; costly special-type undercarriages must be employed. Finally, even more complex designed vehicles of this type are know wherein the loading bridge is arranged only extensible lengthwise on a buckle-type vehicle undercarriage.

In order to not exceed the total weight permissible for a passenger car driver's license in the event of heavyweight loads, the vehicle inclusive the loading bridge must be as lightweight as possible, furthermore the necessary manufacturing cost should be as low as possible. Series-type vehicle undercarriages should be able to be used for the manufacture of the loading and transportation vehicle, since special-type productions are accompanied with substantial extra cost. The elements required for the loading and transportation operations moreover should be simple in construction and manipulation.

SUMMARY OF THE INVENTION

The object of the invention is to fulfil these requirements.

To attain this object the present invention provides a vehicle for loading and transporting heavyweight objects, in particular automotive vehicles, comprising an undercarriage having a front and a rear portion; a loading bridge having a front and a rear end and mounted directly on the vehicle undercarriage both longitudinally shiftable and tiltable about the rear portion thereof; at least one power device engaging, preferably in the vicinity of, the front end of the loading bridge and on the other hand, preferably in the vicinity of, the rear portion of the vehicle undercarriage determining the mutual spacing thereof, said power device being alterable in its length, and at least one pivot lever guided at one end with a slide member in a bridge-stationary slide track and mounted at its other end pivotally in a fulcrum underneath the effective line of the power device, behind the slide member as viewed in relationship to the direction of travel, at the vehicle undercarriage, the slide track at the front having an abutment which by an engagement with the slide member limits the lengthwise extension of the loading bridge.

A single hydraulic apparatus is required only in a simple manner for the lengthwise extension and tilting of the loading bridge as well as for the novel lowering of the rear portion of the vehicle. This hydraulic unit need not be designed very powerful, since by the measures according to the invention a beneficial use of kinematics and gravity point motions is permitted. Also, the required structural elements throughout are of a simple and rigid structure and are virtually free of maintenance requirements.

BRIEF DESCRIPTION OF THE DRAWINGS

An embodiment of the invention will now be described by way of example and with reference to the accompanying drawings in which:

FIG. 1 is a side view, partly in section, of a vehicle according to the invention with retracted loading bridge, i.e. in the transportation condition;

FIG. 2 is a similar view of the vehicle of FIG. 1 with the loading bridge extended;

FIG. 3 is a similar view showing the vehicle with fully extended and tilted loading bridge, and FIG. 4 a plan view, partly in section, of the vehicle with retracted loading bridge.

DESCRIPTION OF THE PREFERRED EMBODIMENT

FIG. 1 shows a loading bridge 1 of a usual design mounted directly on the undercarriage 2 of a vehicle serving to load and transport heavyweight objects, in particular automotive vehicles, on slide surfaces 3 which may also be roller devices longitudinally shiftable and tiltable about the rear end 4 of the vehicle undercarriage 2 with a low-position apparatus including support rolls 34. For effecting these two motions, a hydraulic unit 6 having the form of a cylinder/piston unit is arranged, said hydraulic unit 6 pivoted and engaging on the one hand at the vicinity of the front end 5 of the loading bridge 1 and on the other hand in the vicinity of the rear portion 18 of the vehicle undercarriage2. For performing the tilting motion by this hydraulic unit 6, two relatively spaced pivot levers 7 each having an outboard roll 8 at its forward end are each slidably guided by the roll 8 in a longitudinal slot 9 serving as a slide track and fixed relative to the loading bridge 1 and are each by the other lower end 10 underneath the effective line of the hydraulic unit 6—related to traveling direction—pivotally mounted behind each roll 8 in a fulcrum 11 at the vehicle undercarriage 2. The front end 12 of each longitudinal slot 9 is remote from the roll 8 of the pivot lever 7 by the distance of the extended length when the loading bridge is retracted according to FIG. 1.

According to FIG. 2, the front end 12 of the longitudinal slot 9 effective as abutment 26 engages the roll 8 of the pivot lever 7 when the loading bridge 1 is lengthwise extended. The overall arrangement is correlated in such a way that the overall point of gravity of the loading bridge 1 along with its load related to the traveling direction is located slightly in front of the axle 13 of the rear wheels 29 of the vehicle.

FIG. 3 illustrates the tilted condition of the loading bridge 1 which has been achieved by pivoting the pivot lever 7 engaging with its endwise roll 8 the front end 12 of the longitudinal slot 9 by means of the further retracted hydraulic unit 6.

According to FIG. 1, two ropes 14 connected to the rear axle 13 of the vehicle are each led around a reversing roll 15 arranged at the vehicle undercarriage 2 and around the lower end 10 formed cam-like of one pivot lever 7 each and secured thereto. According to FIG. 3, these ropes 14 accordingly upon pivoting the pivot levers 7 are retracted, thereby the suspension 17 being compressed and the rear axle 13 being drawn toward the vehicle undercarriage 2. The power-positive tensioning of the ropes 14 is preferably initiated beginning with half the pivot range of the pivot levers 7 or at the last part thereof. Thereby, the rear portion 18 of the vehicle undercarriage 2 is lowered and along therewith the supports of the loading bridge 1 at the center and at the front end thereof. It may thereby be given in its completely extended and tilted condition a lesser angle of inclination than without this measure according to the invention. At the rear portion 18 of the undercarriage 2 there are further arranged for the event that particularly heavyweight objects must be loaded two separately extensible or outwardly pivotable ground supports 19.

According to FIG. 4, the two pivot levers 7 are connected with a front upper transverse rod 27 and a rear lower transverse rod 28 so as to form a rigid chassis or frame.

In FIG. 3, there is furthermore illustrated a haulage device 20 known per se for hauling a vehicle rollable for instance on a wheel pair. This haulage device 20 is arranged at the rear portion 18 of the undercarriage 2 pivotally and connected to the loading bridge 1 by means of a short length of rope 22 in such a way that it is lowered to the ground by a lengthwise extension of the loading bridge 1 so that the front end or the rear of the vehicle to be hauled can be received. When retracting the loading bridge by means of the hydraulic unit 6, this haulage device 20 is automatically lifted into transportation position.

The tilting motion of the loading bridge 1 after lengthwise extension, i.e. the beginning of the upward pivoting of the pivot levers 7 is supported in an advantageous fashion by inclined ramp surfaces 24 arranged at the vehicle undercarriage 2, which ramp surfaces coact with cam rolls 25 attached to the loading bridge 1. Said ramp surfaces 24 and cam rolls 25 on the other hand also damp during the loading operation the lowering of the loading bridge 1, in particular in the event loads are located thereupon. Furthermore, a rope winch 21 is attached to the front end 5 of the loading bridge 1.

The rope winch 21 at the front end 5 of the loading bridge 1 may be used in the usual manner for pulling up the load objects onto the loading bridge 1, or it may be used by means of rope guide pulleys 36 attached laterally thereof also for instance when hauling crashed vehicles to bring them into a suitable position relative to the loading and transportation vehicle.

In order to insure a defined stable position of the loading bridge 1 on the vehicle during traveling thereof, a front detent device 37 and a rear detent device 38 are secured to the loading bridge 1, said devices upon retracting of the loading bridge 1 into the transportation position respectively engaging in a complementary front detent recess 39 or a rear detent recess 40 at the vehicle undercarriage 2. At the rear end 23 of the loading bridge 1, there are further provided bottom rolls or rollers 35.

At the vehicle undercarriage 2 there are arranged at suitable locations a hydraulic pump 31, a hydraulic control device 32 and plugs 42 for the connection of a remote control switch 33 provided with a long cable all required for the operation of the hydraulic unit 6.

The operation of the invention is thus:

By introducing pressure fluid into the front pressure chamber of the hydraulic unit 6, the length thereof is reduced. The loading bridge 1 is thereby extended lengthwise rearwardly until the endwise rolls 8 of the pivot levers 7 engage the front ends 12 of the respective longitudinal slots 9 as abutment 26. From here on, upon a further retraction of the hydraulic unit 6 by an upward pivoting of the pivot levers 7 the loading bridge 1 is tilted about the rear portion 18 of the vehicle undercarriage 2 until the pivot levers 7 have reached their maximum deflection, i.e. are substantially vertical or exactly vertical relative to the loading bridge 1, and a ground contact of the rear end 23 of the loading bridge 1 occurs, possibly on the ground rolls or rollers 35. In certain instances, the loading bridge 1 may lift off its tilting support, i.e. the abutment rolls 34 at the rear portion 18 of the vehicle undercarriage 2. A good side stability is provided for in all events, in particular also because the vehicle undercarriage 2 by its own strong engagement with the axle 13 of the rear wheels 29 of the vehicle offers the loading bridge 1 in the tilted condition a defined fixed support. The storage of a part of the energy required for the tilting motion in the stressed suspension 17 in an increasing extent on the one hand effectively damps the later portion of the tilting process, on the other hand this energy is available supportingly again for the loading process when the loading bridge 1, possibly with the heavyweight objects loaded is to be brought into the transportation position again.

The invention permits, because a single power apparatus of low power rating suffices, to perform the entire loading process, i.e. the effecting of the loading bridge motions, merely with the battery of the vehicle, i.e. with the engine inoperative.

The invention may be embodied in other specific forms without departing from the spirit or essential characteristics thereof. The embodiment is therefore to be considered in all respects as illustrative and not restrictive.

What is claimed is:

1. A vehicle for loading and transporting heavyweight objects, in particular automotive vehicles, comprising:
    (a) an undercarriage having a front and a rear portion;
    (b) rear resilient suspension means supporting said undercarriage;
    (c) a loading bridge having a front and a rear end and mounted directly on said undercarriage for movement both longitudinally along said undercarriage and tiltably about said rear portion of said undercarriage;
    (d) at least one longitudinally extending power device extending between a forward position on said loading bridge and a rearward position on said undercarriage, relative to said forward position on said loading bridge;
    (e) at least one pivot lever, means slidably mounting one end of said pivot lever on said loading bridge adjacent the forward end thereof, and pivot means mounting the opposite end of said pivot lever on said undercarriage rearwardly of said slidably mounting means and below the effective line of said power device, said slidable mounting means being adapted to permit said one end of said pivot lever to slide along a predetermined path substantially parallel to said loading bridge and including abutment means at the forward end of said path; and (f) means actuated by tilting movement of said loading bridge for compressing said resilient suspension means;

(g) whereby as said power device is retracted said loading bridge is caused to move rearwardly along said undercarriage until said one end of said pivot lever engages said abutment means of said slidably mounting means, said loading bridge is then caused to tilt with the forward end thereof driven upwardly by pivotal movement of said pivot lever and the rearward end thereof caused to move downwardly, and said resilient suspension means is compressed by said compressing means to lower said rear portion of said undercarriage.

2. A vehicle as set forth in claim 1 wherein said resilient suspension means comprises a rear axle and wheels, said opposite end of said pivot lever which is mounted on said pivot means for pivotal movement about an axis includes cam means and said means for compressing said resilient suspension means comprises flexible cable means extending from said rear axle, about said axis and cam means to a position on said pivot lever between the ends thereof whereby as said loading bridge is caused to tilt with the pivotal movement of said pivot lever said flexible cable means is caused to be drawn over said cam means to compress said resilient suspension means and lower said rear portion of said undercarriage.

3. A vehicle as set forth in claim 1 wherein the center of gravity of said vehicle is at a position forward of the rear axle of said vehicle when said loading bridge has been moved rearwardly and said pivot lever engages said abutment means.

4. A vehicle as set forth in claim 1 wherein said undercarriage further comprises an inclined ramp and said loading bridge comprises means for engaging said ramp as said loading bridge is moved rearwardly to initiate tilting of said loading bridge.

5. A vehicle as set forth in claim 1 wherein said slidably mounting means comprises a slide track and a roll is mounted on said one end of said pivot lever for engaging said slide track.

6. A vehicle as set forth in claim 1 comprising a pair of said pivot levers spaced from each other and joined by at least one transverse rod, and said slidably mounting means comprises a pair of slide tracks coacting with said respective one ends of said pivot levers.

7. A vehicle as set forth in claim 1 wherein said power device comprises a hydraulically operated piston-cylinder unit.

8. A vehicle as set forth in claim 7 further comprising a hydraulic pump connected to said hydraulically operated unit, said hydraulic pump being electrically driven by the battery of said vehicle, and means for controlling said hydraulic pump.

9. A vehicle as set forth in claim 1 further comprising pivotally mounted extensible ground supports at said rear portion of said undercarriage.

10. A vehicle as set forth in claim 1 further comprising support rolls mounted on said rear portion of said undercarriage for supporting said loading bridge during its tilting movement.

11. A vehicle as set forth in claim 1 further comprising rollers mounted on the rear end of said loading bridge for engaging the ground upon tilting of said loading bridge.

12. A vehicle as set forth in claim 1 further comprising a cable which mounted on the front end of said loading bridge.

13. A vehicle as set forth in claim 1 further comprising front and rear detent means for securing said loading bridge in place when said loading bridge is in its forward position on said undercarriage.

14. A vehicle for loading and transporting heavyweight objects, in particular automotive vehicles, comprising:

(a) an undercarriage having a front and a rear portion;

(b) a loading bridge having a front and a rear end and mounted directly on said undercarriage for movement both longitudinally along said undercarriage and tiltably about said rear portion of said undercarriage;

(c) at least one longitudinally extending power device extending between a forward position on said loading bridge and a rearward position on said undercarriage relative to said forward position on said loading bridge;

(d) at least one pivot lever, means slidably mounting one end of said pivot lever on said loading bridge adjacent the forward end thereof, and pivot means mounting the opposite end of said pivot lever on said undercarriage rearwardly of said slidably mounting means and below the effective line of said power device, said slidably mounting means being adapted to permit said one end of said pivot lever to slide along a predetermined path substantially parallel to said loading bridge and including abutment means at the forward end of said path;

(e) a haulage device for lifting and carrying the front or rear portion of a vehicle to be hauled, said haulage device being pivotally mounted on said rear portion of said undercarriage and extending rearwardly; and (f) flexible cable means extending between a position on said haulage device spaced from the pivotal axis of said haulage device and said loading bridge;

(g) whereby the rear end of said haulage device is lowered to the ground when said loading bridge is moved rearwardly on said undercarriage and is raised off the ground when said loading bridge is moved forwardly on said undercarriage.

* * * * *